United States Patent
Hagy et al.

(10) Patent No.: US 6,363,436 B1
(45) Date of Patent: Mar. 26, 2002

(54) METHOD AND SYSTEM FOR LOADING LIBRARIES INTO EMBEDDED SYSTEMS

(75) Inventors: Lee Emison Hagy, Austin; Grama Kasturi Harish, Cedar Park; James Darrell Heath, Austin, all of TX (US); Chakravarthy Jagannadhan, Santa Clara, CA (US); Deepak Anantarao Kulkarni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/791,446

(22) Filed: Jan. 27, 1997

(51) Int. Cl.$^7$ .............................................. G06F 9/445
(52) U.S. Cl. ......................................... 709/331; 717/10
(58) Field of Search ................................ 709/331, 332; 717/10, 1

(56) References Cited

U.S. PATENT DOCUMENTS

| | | | |
|---|---|---|---|
| 5,247,678 A | * | 9/1993 | Littleton ...................... 395/700 |
| 5,375,241 A | | 12/1994 | Walsh ........................ 395/700 |
| 5,410,698 A | | 4/1995 | Danneels et al. ........... 395/650 |

(List continued on next page.)

FOREIGN PATENT DOCUMENTS

| | | |
|---|---|---|
| CA | 2097541 | 12/1994 |
| CA | 2097542 | 12/1994 |
| EP | 0 699 996 A1 | 3/1996 |

(List continued on next page.)

OTHER PUBLICATIONS

"Sixteen– to Thirty–Two–Bit Operating System Compatibility Method for Personal Computers," *IBM Technical Disclosure Bulletin*, vol. 34, No. 4B, pp. 314–317, Sep. 1991.

"Method to Intercept Dynamically Loaded Subroutine Calls on the IBM RISC System/6000 AIX Operating System," *IBM Technical Disclosure Bulletin*, vol. 34, No. 10A, pp. 382–387, Mar. 1993.

"Method for Dynamic Loading of Object Modules in a Graphical User Interface Development Tool," *IBM Technical Disclosure Bulletin*, vol. 36, No. 12, pp. 33–35, Dec. 1993.

"Address Space Partioning Using 'Address Submaps,'" *IBM Technical Disclosure Bulletin*, vol. 37, No. 08,pp. 373–374, Aug. 1994.

"Inter–Program Binding," *IBM Technical Disclosure Bulletin*, vol. 37, No. 12, pp. 415–419, Dec. 1994.

(List continued on next page.)

*Primary Examiner*—St. John Courtenay, III
*Assistant Examiner*—Lewis A. Bullock, Jr.
(74) *Attorney, Agent, or Firm*—Duke W. Yee; Jeffrey S. LaBaw; Stephen J. Walder

(57) ABSTRACT

A method and means for enhancing an embedded system includes a technique for generating shared library information which is stored in the ROM, the shared library information including pointers to structures for each shared library to be preloaded into the ROM, maintaining each module per library as a linked list. When the ROM image is generated, the tool writes the structures describing the preloaded libraries into the ROM image. As pointers to the structures are not valid in the ROM image, the pointers to these modules are relocated so that they are valid in the loader's address space when remapped into the loader by the kernel. At system start-up or "boot," the kernel starts the embedded loader and maps the structures exactly where the loader expects to find them. Thus, when the loader attempts to load an external dynamically linked ELF executable file that is linked to one of the shared libraries in the ROM, the loader resolves all references to the preloaded library by traversing the structures provided that were mapped into its address space by the system kernel.

21 Claims, 2 Drawing Sheets

U.S. PATENT DOCUMENTS

| | | | |
|---|---|---|---|
| 5,414,854 A | * 5/1995 | Heninger et al. | 395/700 |
| 5,418,964 A | 5/1995 | Conner et al. | 395/700 |
| 5,459,865 A | 10/1995 | Heninger et al. | 395/650 |
| 5,465,361 A | 11/1995 | Hoenninger, III | 395/700 |
| 5,475,840 A | 12/1995 | Nelson et al. | 395/700 |
| 5,491,800 A | 2/1996 | Goldsmith et al. | 395/200.12 |
| 5,495,612 A | 2/1996 | Hirayama et al. | 395/700 |
| 5,499,343 A | 3/1996 | Pettus | 395/200.2 |
| 5,634,058 A | * 5/1997 | Allen et al. | 395/712 |
| 5,708,811 A | * 1/1998 | Arendt et al. | 395/712 |
| 5,797,015 A | * 8/1998 | Daniels, Jr. et al. | 395/712 |
| 5,802,368 A | * 9/1998 | Grigsby et al. | 395/685 |
| 5,812,848 A | * 9/1998 | Cohen | 395/685 |
| 5,835,749 A | * 11/1998 | Cobb | 395/500 |
| 6,052,778 A | * 4/2000 | Hagy et al. | 713/2 |

FOREIGN PATENT DOCUMENTS

| | | | |
|---|---|---|---|
| GB | 2 242 293 A | 9/1991 | |
| JP | 63-175929 | 7/1988 | |
| JP | 1-191232 | 1/1989 | G06F/9/06 |
| JP | 01-207824 | 8/1989 | |
| JP | 02-244237 | 9/1990 | |
| JP | 03-022161 | 1/1991 | |
| JP | 4-65717 | 2/1992 | G06F/9/40 |
| JP | 04-116756 | 4/1992 | |
| JP | 04-234424 | 8/1992 | |
| JP | 06019717 A | 1/1994 | G06F/9/445 |
| JP | 06-095869 | 4/1994 | |
| JP | 07-182179 | 7/1995 | |
| JP | 07-325719 | 12/1995 | |
| JP | 08179947 A | 7/1996 | G06F/9/40 |
| JP | 08185318 A | 7/1996 | G06F/9/06 |
| JP | 08202557 A | 8/1996 | G06F/9/445 |
| JP | 08241207 A | 9/1996 | G06F/9/445 |
| WO | WO 95/01598 | 1/1995 | |
| WO | WO 95/17062 | 6/1995 | |

OTHER PUBLICATIONS

"NetWare Loadable Modules Bindery Monitoring," *IBM Technical Discloure Bulletin*, vol. 38, No. 07, pp. 153–154, Jul. 1995.

"Method for Allowing Original Equipment Manufacturer DOS Setting Descriptions and Contextual Help," *IBM Technical Disclosure Bulletin*, vol. 38, No. 10, pp. 141–145, Oct. 1995.

"Fast and Flexible Shared Libraries," Proceedings of the Summer 1993 USENIX Conference, pp. 237–251, Jun. 1993.

"Building Modular Windows Applications with C++," Proceedings of OOP '93, pp. 163–166, Feb. 1993.

"Screen Windows as Objects," *CHIP* (German), No. 12, pp. 188–194, Dec. 1990.

"Portable Multitasking in C++," *Dr. Dobb's Journal*, vol. 20, No. 11, pp. 70, 72, 74, 76, 78, Nov. 1995.

"Dynamic Link Libraries for DOS," *Dr. Dobb's Journal*, vol. 15, No. 5, pp. 30–39, 104–106 and 108–109, May 1990.

"HS/FORTH's Rosetta Stone Dynamic Linker," *Programming Environments*, Rochester FORTH Conference, pp. 41–42, Jun. 1988.

* cited by examiner

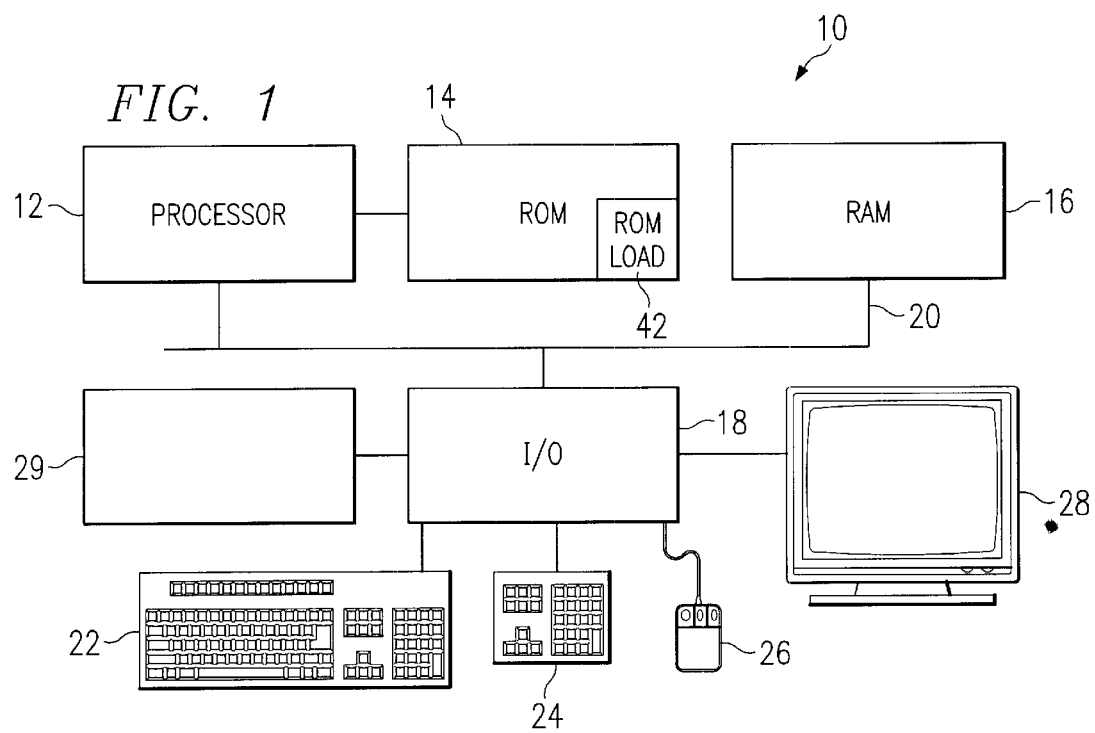
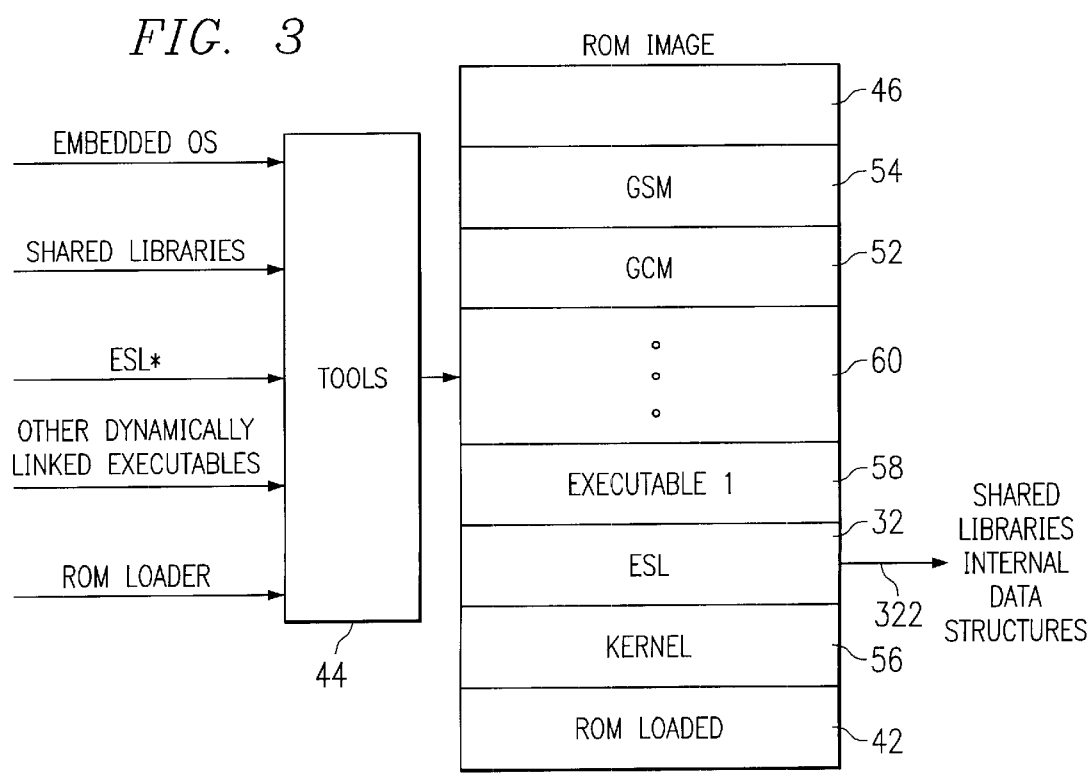

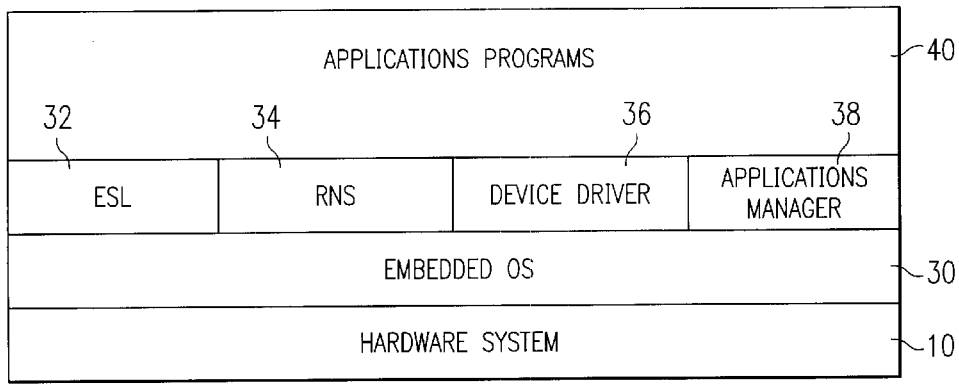
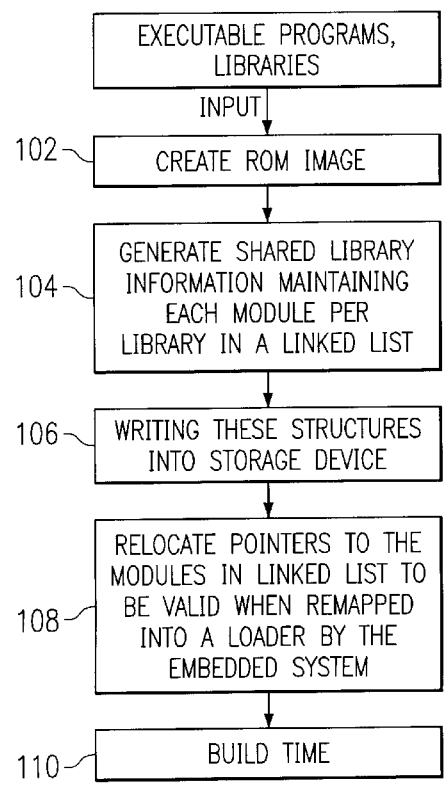
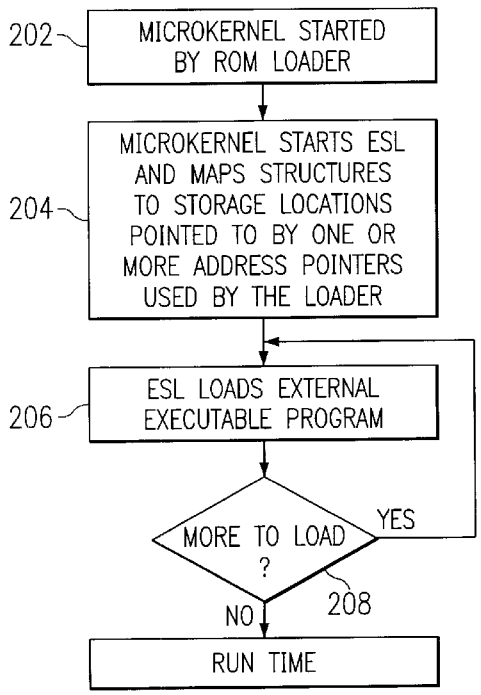

METHOD AND SYSTEM FOR LOADING LIBRARIES INTO EMBEDDED SYSTEMS

BACKGROUND OF THE INVENTION

1. Field of the Invention

The present invention relates to information handling systems and methods and, more particularly, to information handling systems and methods including methods for loading and linking libraries of accessory programs and data.

2. Prior Art

In information handling systems where a kernel of an operating system is stored in a read-only memory (ROM), it is desirable to minimize the area (footprint) of the ROM on the integrated circuit carrying the ROM. In the prior art, all machine readable or executable programs including dynamically linked programs and shared libraries are preloaded into the ROM to create the embedded system.

In a system where the industry standard Executable and Linking Format (ELF) is employed, it is desirable to store the machine readable and executable programs and libraries without storing ELF information. One issue presented by eliminating the ELF information from the ROM is that dynamically linked ELF machine readable files are generally not loadable from an external device to use the preloaded shared libraries.

An embedded system is needed which would provide a smaller area for the ROM by preloading shared libraries in the ROM but with a mechanism for dynamically loading ELF machine readable files from a source outside of the ROM.

SUMMARY OF THE INVENTION

Accordingly, a method and means for enhancing an embedded system includes generating shared library information which is stored in the ROM, the shared library information including pointers to structures for each shared library to be preloaded into the ROM, maintaining each module per library as a linked list, writing the structures describing the preloaded libraries into the ROM image when the ROM image is generated, and as pointers to the structures are not valid in the ROM image, relocating the pointers to these modules so that they are valid in the loader's address space when remapped into a loader by the kernel.

At system start-up or "boot," the kernel starts the embedded loader and maps the structures exactly where the loader expects to find them. Thus, when the loader attempts to load an external dynamically linked ELF executable file that is linked to one of the shared libraries in the ROM, the loader resolves all references to the preloaded library by traversing the structures provided that were mapped into its address space by the system kernel.

It is an advantage of the present invention that the size of the read-only memory in an embedded system may be minimized by allowing dynamically linked programs and shared libraries without the need for the read-only memory to contain all of the ELF information.

BRIEF DESCRIPTION OF THE DRAWINGS

FIG. 1 is a block diagram of a system employing an embedded control system in accordance with the present invention.

FIG. 2 is a block diagram of a system in accordance with the present invention showing the hardware and software elements thereof.

FIG. 3 is a block diagram showing the elements required for generation of the read-only memory image in accordance with the present invention.

FIG. 4 is a flow chart showing the portion of the method in accordance with the present invention executed at system build time.

FIG. 5 is a flow chart showing the portion of the method in accordance with the present invention executed at system run time.

DETAILED DESCRIPTION OF A PREFERRED EMBODIMENT OF THE INVENTION

Embedded control systems may be implemented on one or more integrated circuit chips, where one of the chips includes a read-only memory (ROM) which stores the operating system for the embedded control system. An example of such a system is the IBM Embedded Microkernel system.

Since it is generally desirable to reduce the size of the read-only memory portion of the system, it is desirable to eliminate the need to store extraneous information relating to shared libraries in the ROM when the ROM is created. Also, it is desirable to have the ability to load executable programs and other shared libraries that are linked to the shared libraries in ROM during operation of the System. These executable programs and other shared libraries may be made available to the system through the use of a secondary storage device (e.g., PCMCIA card connection).

Since many of the dynamically linked libraries are generated in an Executable and Linking Format (ELF), in the prior art, it has been necessary to have all of the ELF information stored in the ROM so that any dynamically linked executable or library generated in the ELF format could be loaded from an external device.

The preferred embodiment of the present invention eliminates the need for including all of the ELF information in the ROM while still permitting the loading of dynamically linked libraries and executable programs during system operation.

Referring now to FIG. 1, a system embodying the present invention will be described.

System 10 includes a processor 12, a read-only memory 14, a random access memory 16, an I/O subsystem 18, all of the above connected by system bus 20. The I/O subsystem 18 may include one or more controllers for input/output devices such as a keyboard 22 or keypad 24, a cursor control device 26, a display device 28, and secondary storage device 29. Depending upon the application of the embedded system, one or more of the input/output devices may not be used in the particular application.

Referring now to FIG. 2, the hierarchy of the operating system, tools, utilities and application programs will be described.

The hardware system 10 described with reference to FIG. 1 is controlled by the embedded operating system 30 which in turn controls various tools and applications such the embedded system loader (ESL) 32, a root name server (RNS) 34, one or more device drivers 36, an applications manager 38 and one or application programs 40. The embedded operating system 30, the ESL 32, RNS 34, device drivers 36, applications manager 38, applications 40 and a ROM loader 42 are all included in ROM 14 (see FIG. 1).

The memory space allocated to ESL 32 also contains the shared libraries' internal data structures 322 (see description with reference to FIG. 3).

Shared Libraries

On any system that runs a set of programs, one can usually isolate a number of routines that are common between all of those programs. These routines are normally encapsulated in the form of a library. Each of the programs links with this library and has access to every routine in it.

Depending on the way the library is built, the program can link with it in a one of two ways.

Link statically—in this case the entire library is copied in with the executable that uses it. The advantage here is that this is simple to achieve. This, however, increases the footprint of ROM 14 as the entire library is brought in as many times as the number of executables that reference it.

Link dynamically—in this case shared libraries are used, i.e., only one copy of the library is loaded regardless of the number of executables linking with it. While this makes the tools producing the library and the loader loading the shared libraries and dynamically linked executables more complex and needs additional support from the kernel, it provides the benefit of a considerable savings in ROM footprint.

Pre-loading and PLP (Pre Loaded Format)

In an embedded system environment, extensive use is made of shared libraries. An exemplary binary format to be used with shared libraries is ELF—an industry standard. In order to realize the savings of being dynamically linked and yet not carry complexity and the bulk of the object format into ROM 14, a two step loading process is used. All of the binary format handling capability is moved into a tool (Tool1 44) that generates the ROM image 46.

Referring now to FIG. 3, Tool1 44 is a first stage loading tool that takes as its inputs ROM loader 42, embedded OS 30, the ESL 32, shared libraries, and dynamically linked executables. Tool1 44 outputs a binary image of ROM 14 (see FIG. 3) referred to as ROM image 46. In generating ROM image 46, Tool11 44 processes all of the ELF information contained in each binary file, and loads the text and data of each executable file 58,60. In the case of shared libraries, it creates the GCM 52 (Global Coerced Memory) that contains shared data and the GSM 54 (Global Shared Memory) that contains shared text. Apart from this, Tool1 44 also generates certain structures for each of the shared libraries that it has loaded. This is in order to help the ESL 32 to be able to load additional programs and libraries containing unprocessed ELF information that have dependencies on the preloaded libraries. This information is used by the ESL 32 and is known as the Pre-loaded Format.

In the second step of loading, for each executable, the ESL 32 creates a task container (not shown), maps in the data and text for that executable and also maps in the GCM 52 and GSM 54 for shared library access. This second step of loading happens at run-time.

The contents of ROM image 46 are ROM loader 42, embedded OS 30, ESL 32, Root Name Server 34, device drivers 36 and application programs 40. With the exception of ROM loader 42 and embedded OS 30, all the other programs use a core set of libraries. Significant savings in footprint are achieved by employing shared libraries. A DLL (Dynamically Linked Library) is the same as a shared library. The term DLL is used in OS/2, Windows, and Windows 95.

An enhanced ESL (ESL+) gives embedded systems the ability to load modules that are in ELF format. A module is either an executable (a task) or a DLL. On systems that have some form of secondary storage, it allows extension of the functionality of the system at run-time.

An example of an embedded system is a hand held computer about the size of a calculator. The basic functionality of the system is in the ROM image. The user can plug in a PCMCIA card 29 and then load ELF modules from it. These could be application programs or DLLs loaded by programs in the ROM image. (DLLs can be dynamically loaded and unloaded by tasks at run-time. This is different from the loading of DLLs that is part of the loading of a task).

In creating the embedded system where all programs are dynamically linked, Essential information from the original ELF files are condensed into the small PLF format. This results in a significant saving in ROM footprint.

When a dynamically linked module is loaded, one of the main things the loader must do is resolve all symbol references from the program being loaded to the DLLs already in memory. So for each DLL already in memory, the name and value of each symbol it "exports" must be known. To save space, the PLF format is stripped of all symbol information as well as other nonessential information.

To create an enhanced ESL, information from the ELF format stripped out to make the PLF format must be replaced.

One approach that was considered was to include the ELF format in the ROM image for each DLL in the ROM image. ESL 32 would have had to process this information and build its internal data structures. This would create two representations of the same information for each DLL in ROM 14.

Instead, the internal data structures 322 that Tool1 44 built when it created the ROM image are put into the RON image 46. A further enhancement involves relocating those data structures so that all pointers are relative to the ESL address space as opposed to the Tool1 44 address space.

One of the key elements for being able to use the same internal data structures 322 requires some more background information. Before development of Tool1 44 or ESL 32, a single ELF loader was used for base (non-embedded) systems. This loader is referred to as the base loader. The design of the base loader was very modular in one very key aspect: The core loading functionality (handling ELF format, DLL dependencies, symbol resolution, etc.) was well defined and separate from the rest of the loader. When Tool1 was developed, it used the code and internal data structures from the base loader. Since Tool1 may run in a different environment (UNIX®) (UNIX® is a trademark of Novell Corporation) than the base loader (Micro Kernel), it would have been extremely difficult to reuse code and data structures from the base loader if not for the modularity of the base loader design. In embodying the present invention, all of the ELF processing code from the base loader was used as well as the same internal data structures as the base loader in the enhanced ESL (ESL+). Code is added to enable ESL+ to handle both ELF and PLF formats (as well as resolve symbols between the two formats). So all four loaders (base, Tool1, ESL, ESL+) share much common code and, more importantly, common internal data structures.

The following is a simplified description of the internal data structures 322 used by the four loaders. The key data structure is the module structure. There is one of these for each DLL that has been loaded. All of the module structures are linked together in a doubly linked list. The dependency list is an array of module pointers. These are all the DLLs on which this DLL depends (if routine A in DLL X calls routine B in DLL Y, then X has a dependency on Y). The segment table is an array of segment structures. A module may consist of one or more segments. A segment is either code or data. Code segments are mapped into the target task as read-execute. Data segments are mapped as read-write. The dynamic table contains pointers to the symbol table, string table, export table, and import table. The string table contains all of the symbols needed by the module. The other tables (symbol and import) contain no strings, but represent a string by giving an index into the string table. The export table represents a symbol by giving an index into the symbol table.

The loading process (simplified). is as follows. To load an ELF module (either an executable or DLL):

Open the file containing the module

Map the file (assumes memory-mapped I/O) into the loader's address space

Scan the dependency list in the ELF format

For each dependency, load the DLL specified if it has not already been loaded. This is done recursively so that all dependencies get loaded, and all dependencies of dependencies, and so on.

Map the segments for the module into the target task's address space

Map all dependency DLLs into target task's address space.

Resolve all symbols into dependency DLLs

Close the file containing the module

When building ESL 32, much of the code from the base loader is left out and some (e.g. the part that understands the PLF format) is added in.

ESL+ includes not only all of the functionality of the base loader, but also all the functionality of the ESL.

The following represent the internal data structures used by the ESL+ to handle DLLs. These are core data structures that are common between the ESL+ and Tool1.

| Module Structure | |
|---|---|
| next module ptr | All of the DLLs that have been loaded are linked into a doubly linked list. |
| previous module ptr | |
| dependency list ptr | These are modules on which this module depends. |
| ASCII name of module | |
| reference count | Number of modules that have a dependency on this module. |
| segment table ptr | |
| number of segments | |
| dynamic table ptr | |
| dependency list | An array of module pointers. |
| module ptr | |
| module ptr | |
| ... | |
| ... | |
| module ptr | |
| segment table | An array of segment table entries - see below for format. |
| dynamic table | An array of dynamic table entries - see below for format. |
| symbol table | An array of symbol table entries - see below for format. |
| export table | An array of export table entries - see below for format. |
| import table | An array of import table entries - see below for format. |

| Segment Table Entry |
|---|
| module ptr |
| type of segment |
| starting addr of segment |

| Segment Table Entry |
|---|
| size in bytes of segment |
| map size of segment |

| Dynamic Table Entry |
|---|
| number of dependencies |
| symbol table ptr |
| string table ptr |
| export table ptr |
| import table |

| Symbol Table Entry |
|---|
| name of symbol |
| value of symbol |
| size (optional) |
| info |

| Export Table Entry | |
|---|---|
| ordinal number | |
| symbol | index into symbol table of symbol entry |
| symbol name | index into string table of symbol name |

| Import Table Entry | |
|---|---|
| ordinal number | |
| symbol name | index into string table of symbol name |

The string table is just a sequence of ASCII strings used by the module. Other data structures refer to a string by its index into the string table. So the ASCII representation only has to be stored once. This technique is borrowed from the ELF format.

Referring now to FIG. 4, that portion 100 of the method in accordance with the present invention which is executed at system build time will be described. The embedded system ROM image is created 102 by Tool1 from executable programs and libraries (see FIG. 3). Shared library information is generated 104 wherein a module is maintained for each library in a linked list.

The shared library information is written 106 into a storage device.

Pointers to modules in the linked list are relocated 108 to be valid when remapped into a loader by the embedded system.

At system run time, the following portion 200 of the method in accordance with the present invention, as shown in FIG. 5, is executed.

The embedded OS is started 202 by a ROM loader program. The embedded operating system then starts 204 the embedded system loader and maps structures to storage locations pointed to by one or more address pointers used by the loader.

The embedded system loader then loads 206 external executable programs.

A test 208 is made to determine whether there are more external executable programs to load. If yes, the process returns to step 206. If no, the process exits.

Although the present invention and its advantages have been described in detail, it should be understood that various changes, substitutions and alterations can be made herein without departing from the spirit or scope of the invention as defined in the appended claims.

What is claimed is:

1. A method comprising the steps of:
    generating shared library information which is stored in a storage device, the shared library information including pointers to module structures for each shared library to be loaded into the storage device;
    maintaining each module structure per shared library in a linked list;
    writing the module structures describing loaded libraries into an image of the storage device; and
    relocating the pointers to the module structures in the linked list to be valid when remapped into a loader by an embedded system.

2. A method according to claim 1, further comprising the step of:
    starting an embedded loader; and
    mapping the module structures to storage locations pointed to by one or more address pointers used by the loader.

3. A method according to claim 1, further comprising the steps of:
    loading one or more external executable files to be linked to one of the shared libraries in the storage device.

4. A method according to claim 3, further comprising the steps of:
    resolving all references to a preloaded library by traversing the mapped module structures.

5. The method of claim 1, wherein the image of the storage device is a binary image of a memory generated by processing at least one of an embedded operating system, the shared library information, dynamically linked executables, memory loader, and an embedded system loader.

6. The method of claim 1, wherein the image of the storage device includes at least one of a ROM loader, an embedded operating system, a root name server, a device driver and an application program.

7. The method of claim 1, wherein relocating the pointers to the modules in the linked list to be valid when remapped into a loader by the embedded system includes relocating the pointers from a storage device image generator tool address space to an embedded system loader address space.

8. The method of claim 1, wherein the shared library information includes pre-loaded format information.

9. Apparatus, comprising:
    a processor;
    a first storage device, for storing information to be processed by the processor;
    an operating system for controlling the processing of the information;
    means for generating shared library information which is stored in the first storage device, the shared library information including pointers to module structures for each shared library to be loaded into the first storage device;
    means for maintaining each module structure per library in a linked list;
    means for writing the module structures describing loaded libraries into an image of the first storage device; and
    means for relocating the pointers to the structures in the linked list to be valid when remapped into a loader by an embedded system.

10. Apparatus according to claim 9, further comprising:
    a second storage device; and
    an input/output controller.

11. Apparatus according to claim 9, wherein the first storage device is a read only memory device.

12. Apparatus according to claim 10, wherein the second storage device is a secondary storage device such as a PCMCIA card.

13. Apparatus according to claim 10, wherein the input/output controller controls user inputs and outputs.

14. Apparatus according to claim 9, further comprising:
    means for starting an embedded loader; and
    means for mapping the module structures to storage locations pointed to by one or more address pointers used by the loader.

15. Apparatus according to claim 9, further comprising:
    means for loading one or more external executable files to be linked to one of the shared libraries in the first storage device.

16. Apparatus according to claim 5, further comprising:
    means for resolving all references to a preloaded library by traversing the mapped module structures.

17. The apparatus of claim 9, wherein the image of the storage device is a binary image of a memory generated by processing at least one of an embedded operating system, the shared library information, dynamically linked executables, memory loader, and an embedded system loader.

18. The apparatus of claim 9, wherein the image of the storage device includes at least one of a ROM loader, an embedded operating system, a root name server, a device driver and an application program.

19. The apparatus of claim 5, wherein relocating the pointers to the module structures in the linked list to be valid when remapped into a loader by the embedded system includes relocating the pointers from a storage device image generator tool address space to an embedded system loader address space.

20. A computer program product in a computer readable medium comprising:
    first instructions for generating shared library information which is stored in a storage device, the shared library information including pointers to module structures for each shared library to be loaded into the storage device;
    second instructions for maintaining each module structure per library in a linked list;
    third instructions for writing module structures describing loaded libraries into an image of the storage device; and
    fourth instructions for relocating the pointers to the module structures in the linked list to be valid when remapped into a loader by an embedded system.

21. An apparatus, comprising:
    a processor;
    a storage device, for storing information to be processed by the processor;
    an operating system for controlling the processing of the information; and
    a tool for generating shared library information which is stored in the first storage device, the shared library information including pointers to module structures for each shared library to be loaded into the first storage device, wherein each module structure per library is maintained in a linked list, and wherein the tool writes the module structures for each shared library into an image of the storage device and relocates pointers to the module structures in the linked list so that they will be valid when remapped into a loader by an embedded system.

* * * * *

UNITED STATES PATENT AND TRADEMARK OFFICE
CERTIFICATE OF CORRECTION

PATENT NO. : 6,363,436 B1 Page 1 of 1
DATED : March 26, 2002
INVENTOR(S) : Hagy et al.

It is certified that error appears in the above-identified patent and that said Letters Patent is hereby corrected as shown below:

Column 5,
Line 8, after "(simplified)", please delete ".".

Column 8,
Line 25, after "claim", please delete "5" and insert -- 9 --.
Line 37, after "claim", please delete "5" and insert -- 9 --.

Signed and Sealed this

Twenty-fourth Day of September, 2002

Attest:

Attesting Officer

JAMES E. ROGAN
Director of the United States Patent and Trademark Office